United States Patent
Zaderei et al.

[11] 3,871,689
[45] Mar. 18, 1975

[54] DEVICE FOR SEALING A HIGH-TEMPERATURE CONDUIT

[76] Inventors: Nikolai Nikolaevich Zaderei, ulitsa Proletarskava, 77, kv. 30; Arnold Serafimovich Nikiforov, ulitsa Pavlovskaya, 90, kv. 60; Evgeny Petrovich Ushankov, prospekt Obukhovskoi oborony 215, kv. 17, all of Leningrad, U.S.S.R.

[22] Filed: Mar. 1, 1973

[21] Appl. No.: 337,277

[52] U.S. Cl................ 285/189, 285/228, 285/299
[51] Int. Cl........................... F16l 5/00, F16l 27/12
[58] Field of Search.......... 285/189, 285, 226, 227, 285/228, 299, 300, 301

[56] References Cited
UNITED STATES PATENTS
| | | | |
|---|---|---|---|
| 2,841,419 | 7/1958 | Jay | 285/301 |
| 3,241,868 | 3/1966 | Soderberg | 285/228 |
| 3,620,557 | 7/1969 | Sturm | 285/228 |

FOREIGN PATENTS OR APPLICATIONS
847,783  9/1960  United Kingdom ............... 285/227

*Primary Examiner*—Werner H. Schroeder

[57] ABSTRACT

The device includes a hollow member mounted in the wall and sealingly connected with the conduit passing therethrough. A corrugated element is coaxially received about the conduit and connects the hollow member with the conduit. The device further includes at least one additional hollow member received about the conduit and associated with a similar corrugated elements having the same diameter, as the first-mentioned corrugated element. The additional hollow member and its corrugated elements are successively arranged with said main hollow member and define therebetween a closed space.

Owing to this structure, there is ensured high reliability of sealing of a high-temperature conduit passing through metal or concrete walls.

2 Claims, 2 Drawing Figures

DEVICE FOR SEALING A HIGH-TEMPERATURE CONDUIT

The invention relates to nuclear power plants, and, more particularly, it relates to devices for sealing a high-temperature conduit passing through concrete, metal or other walls of such plants.

Known in the art are devices for sealing a high-temperature conduit in a wall, comprising a hollow member mounted in the opening in the metal wall. The conduits passes through this member and is sealingly connected thereto by a corrugated element.

This corrugated element is a flexible element taking up the deformation of the conduit, as the latter is being either heated up or cooled down, and thus considerably reducing the deformation and relieving the strain that would be otherwise present in walls, welded joints and other parts of the plant.

Said corrugated element is connected to the housing of a packing gland, which, in its turn, is connected to the conduit by a soft packing.

The packing is compressed by spring means (see, for example the U.S. Pat. No. 2,185,450, Cl. 285–158).

A considerable disadvantage of these known devices is insufficiently high quality of the sealing performance, resulting in leakage of fluids between the conduit and the packing.

There are further known devices for sealing a high-temperature conduit in a wall, wherein a hollow member, also mounted in the wall, is sealingly connected with the conduit through a corrugated element attached to an annular disc rigidly mounted on the conduit (see, for example, the French Patent No. 1,178,105, Cl. F 28 d).

A disadvantage of said devices of this known kind is that the corrugated element therein is subjected to alternating strains, as the conduit is being heated up and cooled down, which results in destruction of this element. When the element is destructed, the device, as a whole, immediately loses its sealing properties.

There are also known devices for sealing a conduit passing through a combined concrete and metal wall. These devices include a hollow member of which one end is rigidly connected with the conduit and the walls, while the other end of this hollow member is connected through a corrugated element to an annular disc which is sealingly connected with the conduit (see, for example, the U.S. Pat. No. 3,488,067; Cl. 285–41).

A disadvantage of these devices is the limited field of their applications. Devices of the above-mentioned kind cannot be employed, when the metal wall and the concrete one are separated from each other, since when the walls are spaced, the effort produced by thermal expansion of the conduit is transmitted to the metal wall and affects the stability of the latter.

It is an object of the present invention to increase the reliability of sealing a high-temperature conduit passing through walls.

It is another object of the present invention to provide a device for sealing a high-temperature conduit, which should be operable both when the walls it passes through are combined and spaced.

It is a further object of the present invention to provide a device which should be simple and practical in service and inexpensive in manufacture.

These and other objects are accomplished in a device for sealing a high-temperature conduit in a wall, comprising a hollow member mounted in said wall and sealingly connected with said conduit passing therethrough by means of a corrugated element arranged coaxially with said conduit and connected therewith, which device, in accordance with the present invention, further includes at least one additional hollow member arranged about said conduit and associated with a corrugated element having the same diameter, as the abovesaid corrugated element, said additional member and said corrugated element associated therewith being connected with said main hollow member and said corrugated element thereof, so that they define therebetween a closed space.

It is expedient that in a device constructed in accordance with the present invention said corrugated element of said main hollow member should have one end thereof connected to said additional hollow member and the other end thereof connected to its own said main hollow member.

It is further expedient that in a device constructed in accordance with the present invention said corrugated element of said additional hollow member should have one end thereof connected to said main hollow member and the other end thereof connected to its own said additional hollow member.

In a device of the herein disclosed structure there is stepped up the reliability of sealing of the high-temperature conduit, since destruction of either one of the corrugated elements does not result in the device completely losing its sealing properties. Moreover, the presence of the abovementioned closed space enables to detect immediately the breakage of either one of the corrugated elements.

Furthermore, the employment of the corrugated elements of the same diameter provides for high quality of sealing at minimal manufacture costs of the device.

Following hereinbelow is a detailed description of the present invention, with reference being had to the appended drawings, wherein.

Figure 1:
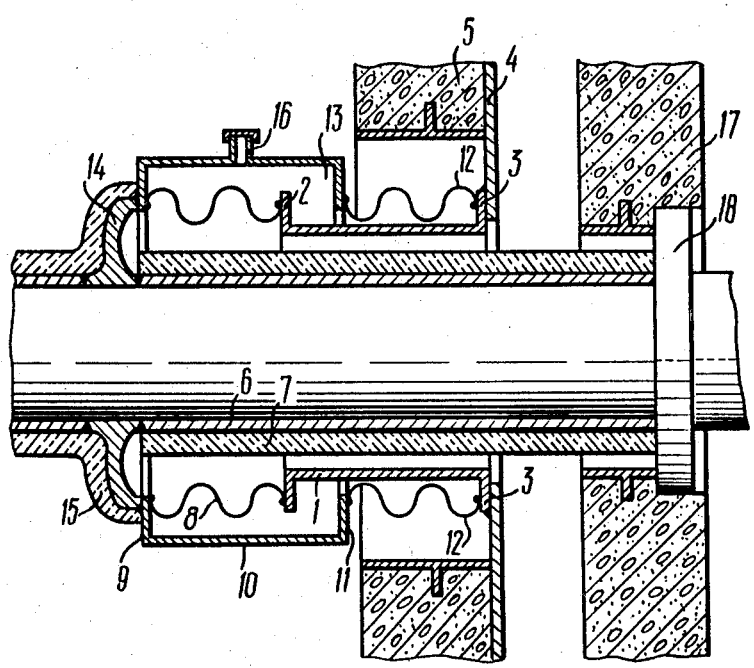
FIG. 1 is a general axially sectional view of a device for sealing a high-temperature conduit in a wall, constructed in accordance with the present invention.

Referring now in particular to the appended drawings, the device for sealing a high-temperature conduit in a wall includes a hollow member 1 (FIG. 1) having a pair of radially outwardly projecting flanges 2 and 3.

By the flange 3 this hollow member 1 is secured directly to a metal wall 4 combined with a concrete wall 5. Passing internally of the hollow member 1 is a conduit 6 having a thermal insulation coating 7.

A corrugated element 8 is connected by one end thereof to the flange 2 of the hollow member 1, while the opposite end of this element is connected to the radially inwardly projecting flange 9 of an additional hollow member 10 which is mounted about the corrugated element 8, the other inwardly radially projecting flange 11 of the member 10 being connected with an additional corrugated element 12 which is of the same diameter, as the abovementioned corrugated element 8.

The corrugated element 12 is connected to the main hollow member 1 by its abovementioned flange 3. Owing to this character of the connections between the main hollow member 1, its corrugated element 8, the additional hollow member 10 and its corrugated element 12, there is formed a closed space 13.

Said flange 9 of the member 10 is rigidly secured to the conduit 6 through an annular disc 14 mounted on the conduit and associated with thermal insulation 15.

To monitor the sealed state of the closed space 13 the hollow member 10 has a connection 16 through which the space 13 communicates with a signal device (not shown in the drawings).

The conduit 6 is connected to a wall 17 by any suitable known attachment means 18.

Figure 2:
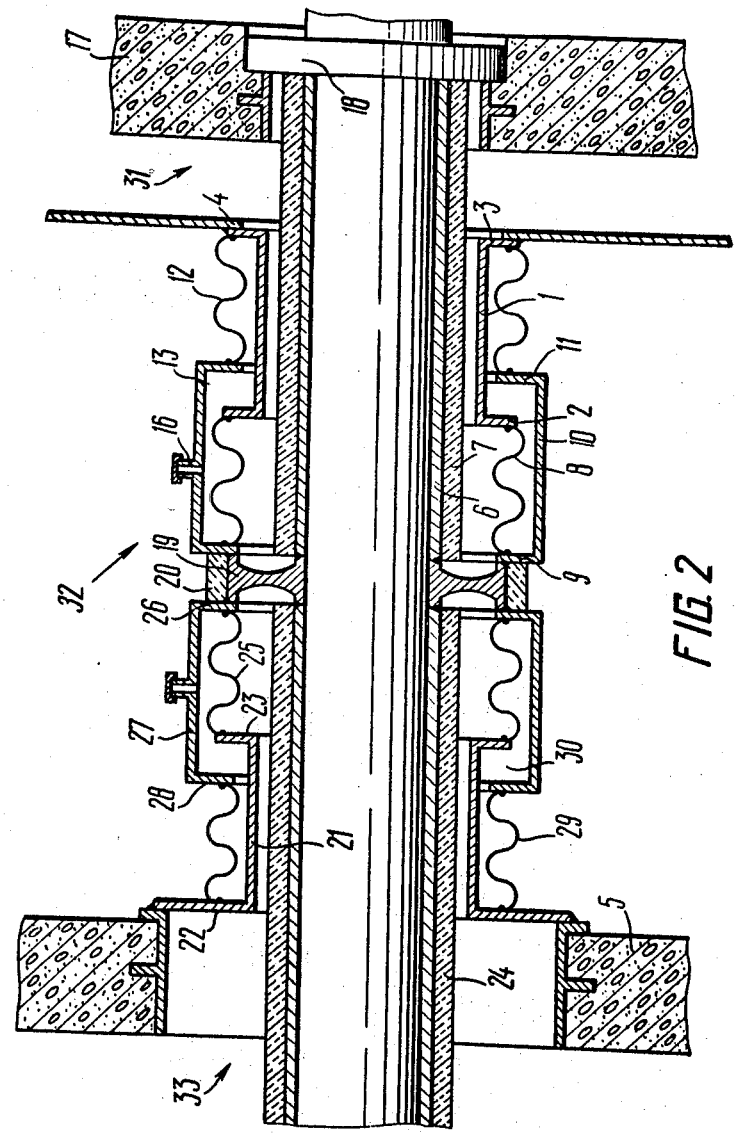
FIG. 2 shows a pair of identical devices of the kind illustrated in FIG. 1, arranged symmetrically in respect of the annular disc of the conduit and positioned between a metal wall and a concrete wall.

FIG. 2 shows a pair of devices similar to the device described hereinabove. The two devices are interconnected by an annular disc 19 mounted on the conduit 6 and associated with thermal insulation 20.

The hollow member 21 is provided with radially inwardly projecting flanges 22 and 23. By this flange 22 the hollow member 21 is secured directly to the wall 5. The conduit 6 coated with thermal insulation 24 passes through the hollow member 21. The flange 23 of the hollow member 21 has secured thereto one end of a corrugated element 25, the opposite end of this element being connected to the radially inwardly projecting flange 26 of a hollow member 27 arranged about the corrugated element 25. The flange 26 is also rigidly secured to the annular disc 19. The radially inwardly projecting flange 28 of the same hollow member 27 is connected to one end of a corrugated element 29 arranged about a hollow member 21. The opposite end of the corrugated element 29 is connected to the flange 22.

The abovedescribed connections of the hollow member 27 and its corrugated element 29 with the hollow member 21 and the corrugated element 25 result in the formation of a closed space 30.

The presence of a pair of herein disclosed devices for sealing a high-temperature conduit, when the latter passes through a pair of walls, allows for insulating by the double barrier of the corrugated elements 8 and 12 the space 31 from the space 32, and for likewise insulating by the double barrier of the corrugated elements 25 and 29 the space 31 from the space 33. Therefore, the spaces 31 and 32 may contain gases, vapors, liquids and any other fluids which, owing to the abovedescribed protection, would not leak into the air in the space 33.

The performance of a device for sealing a high-temperature conduit in a wall, illustrated in FIG. 1, is, as follows.

When a heated fluid, e.g., liquid, steam, etc. flows through the conduit, the conduit becomes thermally expanded, and when it is cooled down, it becomes thermally contracted.

The corrugated elements 8 and 12 being axially flexible bodies, they are able to expand together with the expanding conduit and to contract, when it is contracted.

By taking up the deformation of the conduit, the corrugated elements 8 and 12 reduce the deformation and relieve the strain that would be otherwise present in the wall 4, in the welded joints and in other parts of the structure, whereby the herein disclosed device maintains its sealing properties through long periods.

The closed space 13 defined by the elements of the device acts as a double barrier, the breakage of either one of the two corrugated elements 8 and 12 not resulting in the sealing device, as a whole, losing its sealing properties.

Furthermore, the presence of the sealed closed space 13 enables, should either one of the corrugated elements break, to detect immediately this breakage, before the device loses its sealing properties, by receiving a corresponding signal through the connection 16.

The performance of the device illustrated in FIG. 2 is similar to that of the device illustrated in FIG. 1, the only difference being that here the expansion of the conduit leads to the corrugated elements 8 and 12 becoming expanded and the corrugated elements 25 and 29 becoming contracted.

When the conduit is contracted, the corrugated elements 8 and 12 are contracted, whereas the corrugated elements 25 and 29 are expanded. Moreover, the presence of the second sealed spaced 30 means the presence of the second double barrier, whereby the possibility of the device losing its sealing properties is reduced still further. Should the sealing of the space 30 be affected, the situation can be likewise monitored through the connection similar to the connection 16 and communicating with the signal device (not shown).

What is claimed is:

1. A device for sealing a high-temperature conduit in a wall, comprising: a first hollow member and a first corrugated member sealingly interconnected by their ends; and a second hollow member and a second corrugated member sealingly interconnected by their ends, said corrugated members being similar to each other and of the same diameters, and said first and second members being arranged coaxially about each other and about said conduit and forming a closed space around said conduit so that free ends of said first hollow member and said second corrugated member are sealingly connected to said wall and the free ends of said second hollow member and said first corrugated member are sealingly connected to said conduit.

2. A device for sealing a high-temperature conduit in a wall, comprising: a hollow member mounted in said wall and sealingly connected with said conduit passing therethrough; a corrugated element arranged coaxially about said conduit and connecting said hollow member with said conduit; at least one additional hollow member received about said conduit; at least one similar additional corrugated element having a diameter equal to that of said first-mentioned corrugated element, said additional hollow member and said corrugated element associated therewith being positioned next to said first-mentioned hollow member and said first-mentioned corrugated element along said conduit; means for connecting said first-mentioned hollow member and corrugated element with said additional hollow member and corrugated element, a closed space defined between said additional hollow member and said corrugated element associated therewith and said first-mentioned hollow member and said first-mentioned corrugated element associated therewith, said corrugated element associated with said first-mentioned hollow member having one end thereof connected to said additional hollow member and the other end thereof connected to its own said first-mentioned hollow member, said corrugated element associated with said additional hollow member having one end thereof connected to said first-mentioned hollow member and the other end thereof connected to said additional hollow member.

* * * * *